United States Patent [19]

Vincent

[11] 3,852,537

[45] Dec. 3, 1974

[54] TELEPHONE STATION DISCONNECT DEVICE

[75] Inventor: Ogden W. Vincent, Anaheim, Calif.

[73] Assignee: San/Bar Corporation, Santa Ana, Calif.

[22] Filed: Feb. 22, 1973

[21] Appl. No.: 334,633

[52] U.S. Cl. .......................... 179/17 B, 179/84 VF

[51] Int. Cl. .......................................... H04m 3/16

[58] Field of Search ......... 179/81 R, 84 R, 175.3 X, 179/17 B

[56] References Cited

UNITED STATES PATENTS

| | | | |
|---|---|---|---|
| 1,112,415 | 9/1914 | Kneisly | 179/16 A |
| 3,293,371 | 12/1966 | Burns et al. | 179/84 VF |
| 3,539,731 | 11/1970 | Legedza | 179/84 VF |
| 3,766,336 | 10/1973 | Wikholm | 179/175.3 R |

*Primary Examiner*—William C. Cooper
*Attorney, Agent, or Firm*—Jackson & Jones

[57] ABSTRACT

A station disconect device intended for installation and use at each of several subscriber stations in a multi-party telephone system, is disclosed. The station disconnect device serves to permit the remote connection or disconnection of each station. A relay controlled contact is connected in either or both of the conventional pair of conductors that connect a subscriber's telephone to the tip and ring conductors extending to a central office facility. The relay is connected to be actuated by a frequency responsive relay control circuit including detector circuits that are responsive to a pair of preselected frequencies that are simultaneously transmitted from the central office facility to have the individual subscriber stations remotely connected or disconnected.

16 Claims, 1 Drawing Figure

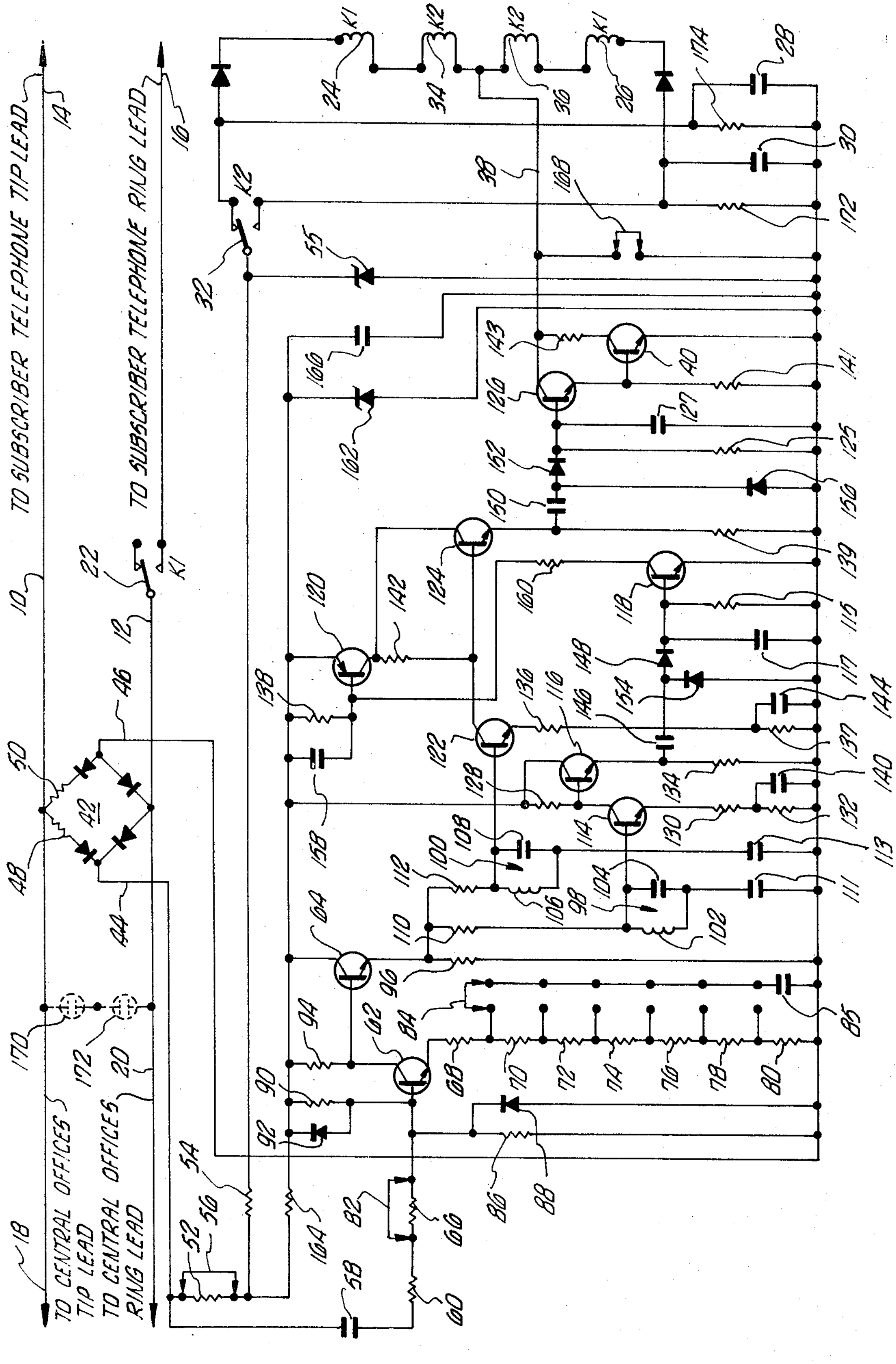
TO SUBSCRIBER TELEPHONE TIP LEAD
TO SUBSCRIBER TELEPHONE RING LEAD
TO CENTRAL OFFICES TIP LEAD
TO CENTRAL OFFICES RING LEAD

TELEPHONE STATION DISCONNECT DEVICE

BACKGROUND OF THE INVENTION

1. Field of the Invention

This invention generally relates to a switching device that is particularly useful in conjunction with multi-party telephone systems. More particularly, the present invention concerns a switching device that may be installed at each subscriber station in a multi-party telephone system to permit the remote connection or disconnection of each subscriber station.

2. Description of the Prior Art

As is well known, multi-party telephone systems of the type sometimes colloquially referred to as "party lines" involve a number of telephone users or subscriber stations which share a single pair of line conductors extending from a central office facility. In such a system each of the subscriber stations are effectively connected in parallel by being connected to the same pair of line conductors. Typically, each of the subscribers would have their own telephone number but would, by reason of sharing a common pair of line conductors, be able to listen or talk to each other by simply using their respective telephones simultaneously.

In practice, private telephone lines, i.e., not shared by several parties, may be simply connected or disconnected at a central telephone facility. By comparison, multi-party lines require that a telephone serviceman or installer physically go to a subscriber's location to connect or disconnect a telephone. Such an actual visit by a telephone installer to connect or disconnect a telephone in a multi-party system is required because the pair of line conductors serving all of the subscribers in the system may not be simply disconnected at the central office facility for the obvious reason that the line conductors are required to provide service to other subscribers in the system irrespective of any single subscriber wishing to discontinue service.

Needless to point out, a significant savings in cost, time, and manpower would result by the capability of remotely connecting and/or disconnecting telephones in a multi-party system.

It is accordingly the intention of the present invention to provide a device that is suitable for installation at subscriber stations of a multi-party system to permit individual telephones to be remotely connected and/or disconnected.

SUMMARY OF THE INVENTION

Briefly described, the present invention involves a multi-party station disconnect device which serves to permit individual subscriber stations of a multi-party system to be remotely connected and/or disconnected.

More particularly, the subject disconnect device involves a relay switch that is connected to either complete or break the connections of a subscribers's telephone to a pair of line conductors extending to a telephone central office facility. A frequency responsive control circuit serves to actuate the relay in response to the simultaneous reception of a pair of predetermined frequencies that are transmitted from the central office facility over the pair of line conductors.

The objects and many attendant advantages of the invention will be more readily appreciated as the same becomes better understood by reference to the following detailed description which is to be considered in connection with the accompanying drawings wherein like reference symbols designate like parts throughout the figure thereof.

BRIEF DESCRIPTION OF THE DRAWINGS

The FIGURE is a schematic circuit diagram illustrating a preferred embodiment of the present invention.

DESCRIPTION OF THE PREFERRED EMBODIMENT

Referring to the drawings, a pair of conductors 10 and 12 are included for effectively connecting a subscriber's telephone (not shown) to the standard tip and ring conductors extending to a central office facility. For example, the conductor 10 would serve to interconnect the tip conductor from a central office with the tip lead of a subscriber's telephone. The conductor 12 would serve the same function with respect to the ring conductors. To this end, a subscriber's telephone would be connected at the respective ends 14 and 16 of the conductors 10 and 12 while the central office tip and ring conductors would be respectively connected to the ends 18 and 20 of the conductors 10 and 12.

A relay contact 22 may be connected in either or both of the conductors 10 and 12 to complete or break the subscriber loop or electrical path to the subscriber station. Whenever the contact 22 is in a closed condition, the subscriber loop would be completed. Similarly, the subscriber loop would be broken whenever the contact 22 is in an open position (as shown). When a pair of contacts are used to provide a degree of redundancy, i.e., one for each of the conductors 10 and 12, the contacts should be concurrently operated to produce the same effect.

Operation of the contact 22 is controlled by the energization of either of a pair of coils 24 or 26 of a relay K1. Such relay K1 may be any of the conventional forms of relays such as latching magnetic relays having plural coils which will each control the contact when energized.

The relay coils 24 and 26 of the relay K1 are connected to be energized by the discharge of energy stored by a pair of capacitors 28 and 30, respectively. The respective capacitors 28 and 30 are selectively charged as determined by the position of a relay contact 32 which is repositioned in response to the energization of the relay coils 34 or 36 of a relay K2. As shown, the coils of the relay K2 are respectively connected in series with the coils 24 and 26 of the relay K1 such that one coil of each relay is energized concurrently by the controlled discharge of the capacitors 28 and 30.

The illustrated position of the relay contact 32 will permit the capacitor 28 to be charged in a manner to be hereinafter explained in greater detail. The capacitor 28 will hence be the capacitor to be discharged through the coils 24 and 34 when an electrically conductive path via a conductor 38 and a transistor 40 is completed whenever the transistor 40 is conductive. Such energization of the coils 24 and 34 will cause the respective contacts 22 and 32 to reverse positions. The contact 22 will thus be closed to complete the telephone loop provided by conductors 10 and 12. Reversal of the position of the contact 32 will connect the capacitor 30 to become charged. Accordingly, the next time an electrically conductive path via the lead 38 and the transistor 40 is provided, the capacitor 30 will be discharged through the coils 26 and 36 to again reverse the position of the contacts 22 and 32 to respectively break the conductive path provided by the conductor 12 and reconnect the capacitor 28 to be charged.

Charging of the capacitors 28 and 30 is accomplished by tapping the line voltage that is normally present on the line conductor 10 and 12. To this end, a diode bridge 42 is connected between the conductors 10 and 12. As shown, the bridge 42 may include four diodes which are connected to form a full wave rectifier. Line voltage is thus provided at a pair of output terminals 44 and 46 of the bridge 42. A pair of resistors 48 and 50 may be included in the rectifier bridge 42 for the purpose of providing high voltage protection.

A pair of resistors 52 and 54 are connected in series between the bridge output terminal 44 and the contact 32 for charging the capacitors 28 or 30. The resistors 52 serves as a current limiting resistor for 48 volt operation, i.e., when the line voltage is 48 volts. The resistor may be shunted with a jumper 56 to be short circuited for 24 volt operation. A zener diode 55 is provided as a constant voltage source.

The transistor 40 is rendered conductive to provide a complete discharge path for the capacitors 28 or 30 in response to the simultaneous transmission of a predetermined pair of frequency signals from the central office facility. Such frequency signals would be applied via the standard central office tip and ring conductors to the terminals 18 and 20 of the conductors 10 and 12, respectively. Such frequency signals would thus be conducted through the bridge 42 and be applied via a DC blocking capacitor 58 and a resistor 60 to a transistor amplifier essentially formed by a pair of transistors 62 and 64 which are normally in a conductive state.

The gain of the amplifier is controlled by a resistor 66 connected in series with the base electrode of the transistor 62 and by the series connected resistors 68, 70, 74, 76, 78 and 80 connected to the emitter electrode of the transistor 62. The resistor 66 may be short circuited by the use of a jumper 82 or the like to control signal attenuation. Similarly, a desired number of the resistors 68, 70, 72, 74, 76, 78 and 80 may be connected to capacitor 85 with a jumper 84 to make a gain adjustment for the amplifier. A capacitor 85 provides an AC path to ground or common potential.

High voltage protection for the transistor 62, to prevent damage that may result from AC signals occurring on the conductors 10 and 12, is provided by parallel connected resistor 86 and diode 88 and parallel connected resistor 90 and diode 92. Resistors 94 and 96 are also provided as biasing resistors for the transistors 62 and 64.

The frequency signals provided through the amplifier formed by the transistors 62 and 64 are applied to a pair of filter circuits 98 and 100. As shown, the filter circuit 98 essentially includes an inductor 102 and a capacitor 104 which are connected in parallel. Similarly, the filter circuit 100 includes an inductor 106 and a capacitor 108 which are connected in parallel. Input resistors 110 and 112 serve to connect the amplifier output to the filter circuits 98 and 100. Capacitors 111 and 113 provide an AC path to ground or common potential.

The two different frequencies to which the filter circuits 98 and 100 are tuned should be selected to be unique to a particular disconnect device used in a multi-party telephone system. For example, where a system includes six different subscriber stations, then six different pairs of frequencies would be used The use of two frequencies that must be simultaneously transmitted for a predetermined length of time, as is later explained in greater detail, prevents inadvertant operation of the disconnect device in response to voice frequency signals that would be present during the course of normal usage of the subscriber telephones. Different frequency ranges may be used for the filter circuits 98 and 100 and for corresponding filter circuits included on companion disconnect devices. For example, the filter circuit 98 may be tuned to a frequency in the range 900 to 1,200 Hz while the filter 100 may be tuned to be responsive to a frequency in the range 1,500 to 2,000 Hz. Selection of pairs of frequencies that are not harmonically related is preferred to help in preventing the earlier mentioned inadvertant operation.

A frequency signal to which the filter 98 is tuned is amplified by a transistor amplifier formed by a pair of transistors 114 and 116 which are normally conductive. The amplified signals are applied to render transistors 118 and 120 conductive. The transistors 118 and 120 essentially operate as gating transistors.

Delayed operation of the transistor 118 is controlled by the time constant set by a parallel connected resistor 115 and capacitor 117. This time delay forms a part of the overall required delay of the disconnect device, which overall delay is primarily determinative of the necessary time duration of the simultaneously transmitted frequency signals.

An amplifier formed by a pair of transistors 122 and 124 is rendered operative when the transistor 120 is conductive, i.e., the transistors 122 and 124 are rendered conductive. The amplified signals passed through the filter 100 are thus provided at the output of the amplifier, at the emitter electrode of the transistor 124, and are applied to render output transistors 126 and 40 conductive. The transistor 40 when conductive, provides the earlier mentioned conductive path to enable discharge of either of the capacitors 28 and 30 through one of the coils of the relays K1 and K2.

Delayed operation of the transistors 126 and 40 is caused by a parallel connected resistor 125 and capacitor 127, the time contact of which may be set to contribute to the earlier mentioned overall time delay for the disconnect device.

As shown, appropriate biasing for the transistors 114 and 116 are provided by resistors 128, 130, 132 and 134. Appropriate biasing is provided for the transistor 122 by resistors 136 and 137. Similarly, resistors 138 and 139 act as biasing resistors for the resistors 120 and 124, respectively. Resistors 141 and 143 provide biasing for the transistors 126 and 40.

The gain of the amplifier provided by the transistors 114 and 116 is controlled by the combination of resistors 128 and 130 in conjunction with a capacitor 140. Similraly, the gain of the amplifier provided by the transistors 122 and 124 is controlled by the combination of the resistors 136 and 142 in conjunction with a capacitor 144.

Amplified AC signals appearing at the output of the amplifier formed by the transistors 114 and 116 are applied to the transistor 118 via a capacitor 146 and a diode 148. Similarly, amplified AC signals are provided from the amplifier formed by the transistors 122 and 124 to the transistor 126 via a capacitor 150 and a diode 152. The AC signals applied to the gating transistors 118 and 126 are accordingly rectified and applied to charge capacitors 117 and 127, respectively. Diodes 154 and 156 serve to provide a path to ground or common potential for the negative half cycles of the amplified AC signals. Charging of the capacitor 117 serves to render the transistor 118 conductive. Similarly, charging of the capacitor 127 renders the transistor 126 conductive.

Filtering of any AC rippling in the operation of the transistor 118 is accomplished with a capacitor 158 that is connected in series with a biasing resistor 160 connected to the collector electrode of the transistor 118.

As earlier mentioned, power for the circuitry of the disconnect device is drawn from the line voltage present on the tip and ring conductors extending from the central office. A zener diode 162 is effectively connected across the terminals 44 and 46 of the bridge 42 via a current limiting resistor 164 and the resistor 52 to form a constant voltage source for the transistor network heretofore described. A capacitor 166 connected in parallel with the zener diode 162 serves to filter out AC signals to have DC power suitably provided to the circuitry.

Manual repositioning of the contacts is provided by use of a jumper 168 to short circuit the transistor 40 and thereby complete a path to common or ground potential. Such manual operation may be desired as an alternative to remote operation of the disconnect device by the transmission of frequency signals and to accommodate instances in which a telephone installer is present at a subscriber station.

As shown, lightning protection may be provided by connecting a pair of conventional lightning protectors 170 and 172 across the terminals 18 and 20 of the conductors 10 and 12, respectively.

It is to be noted that the terminals 14 and 16 of the conductors 10 and 12 may not be interconnected via a subscriber's telephone at the time the subject disconnect device is to be operated because such interconnection would effectively short circuit the disconnect device.

It is presently contemplated that a multi-station system may include up to six subscriber stations that are equipped with a disconnect device in accordance with the present invention. Such maximum number of units is determined by the amount of power that can be drawn from the line voltage existing on the line conductors without affecting telephone service. It has been empirically determined that a disconnect device in accordance with the subject invention draws approximately 0.4 milliamperes under ambient conditions due to at least in part the transistors 62, 64, 114 and 116 normally being conductive. Assuming that 2.4 milliamperes may be drawn from the line conductors without any derogatory effect on the service provided at the subscriber telephones, then up to 6 units may be used.

By way of example, but not in a limiting sense, elements having the below enumerated values may be used in a disconnect device in accordance with the present invention.

| | |
|---|---|
| Capacitors 28, 30 | 6.8 microfarads |
| Resistors 48, 50 | 100 ohms |
| Resistor 52 | 43 kilohms |
| Resistors 54, 66, 96, 160 | 100 kilohms |
| Capacitor 58 | 0.047 microfarads |
| Resistor 60 | 4.7 kilohms |
| Resistor 68 | 2.15 kilohms |
| Resistor 70 | 549 ohms |
| Resistor 72 | 698 ohms |
| Resistor 74 | 887 ohms |
| Resistor 76 | 1100 ohms |
| Resistor 78 | 1400 ohms |
| Resistor 80 | 15 kilohms |
| Capacitor 85 | 1.0 microfarads |
| Resistors 86, 128, 137 | 75 kilohms |
| Resistor 90 | 200 kilohms |
| Resistor 94 | 39.2 kilohms |
| Inductors 102, 106 | 1.0 henry |
| Capacitor 104 | 0.03 microfarads |
| Capacitors 108, 111, 113, 140, 144, 158 | 0.1 microfarads |
| Resistors 110, 112 | 300 kilohms |
| Capacitors 117, 142 | 3.3 microfarads |
| Resistor 125 | 47 kilohms |
| Capacitor 127 | 2.2 microfarads |
| Resistor 130 | 51 kilohms |
| Resistor 132 | 91 kilohms |
| Resistor 134 | 82 kilohms |
| Resistors 136, 139, 164 | 22 kilohms |
| Resistor 138 | 27 kilohms |
| Resistor 141 | 10 kilohms |
| Resistor 143 | 36 ohms |
| Capacitors 146, 150 | 0.15 microfarads |
| Capacitor 166 | 22 microfarads |
| Resistors 172, 174 | 2 megohms |
| All transistors | Type 2N3565 |
| Zener diode 55 | Type IN5254 |
| Zener Diode 162 | Type IN965B |
| All other diodes | Type IN4148 |

From the foregoing description, it may now be appreciated that the present disconnect device is useful for permitting remote connection or disconnection of individual subscriber telephones in a multi-party system wherein each of these subscriber telephones are connected to a common pair of tip and ring conductors extending from a central office facility and would otherwise normally require manual connection or disconnection at the subscriber station.

While a preferred embodiment of the present invention has been described hereinabove, it is intended that all matter contained in the above description and shown in the accompanying drawings be interpreted as illustrative and not in a limiting sense and that all modifications, constructions and arrangements which fall within the scope and spirit of the invention may be made.

What is claimed is:

1. A disconnect device intended for use with individual subscriber telephones in a multi-subscriber telephone system for enabling remote connection or disconnection of the individual subscriber telephones to a single pair of line conductors by which telephone service is extended from a central facility to all subscribers, said device comprising:

first means for being operated to complete or break an electrical connection between at least one of said pair of line conductors and a subscriber telephone, said first means being electrically installed between at least one of said pair of line conductors and said telephone; and second means for operating said first means in response to the concurrent application of two predetermined frequency signals for a predetermined period.

2. The disconnect device defined by claim 1, said first means including a relay having a contact connected in series between one of said line conductors and said subscriber telephone for completing or breaking an electrical connection therebetween.

3. The disconnect device defined by claim 1, said first means including a relay having a pair of relay coils and a relay contact connected in series between one of said line conductors and said subscriber telephone, energization of a first one of said pair of coils causing closure of said relay contact to complete an electrical connection between said one line conductor and said subscriber telephone, and energization of a second one of said pair of coils causing opening of said relay contact to break any electrical connection therethrough between said one line conductor and said subscriber telephone.

4. The disconnect device defined by claim 1, said second means including:

control means for selectively enabling operation of said first means; and frequency sensitive means for actuating said control means in response to the concurrent application of said two predetermined frequency signals.

5. The disconnect device defined by claim 4, said frequency sensitive means including:

first and second filter circuits each tuned for one of said predetermined frequencies;

gating means connected to said first filter circuit for being actuated by the application of first frequency signals transmitted through said first filter circuit;

third means for applying second frequency signals to said control means, said third means being enabled by said gating means when actuated by said first frequency signals.

6. A disconnect device defined by claim 1, said second means including:

a first filter circuit tuned for a first one of said predetermined frequency signals;

a second filter circuit tuned for a second one of said predetermined frequency signals;

a first gating circuit connected to be actuated by said first frequency signals when transmitted through said first filter circuit, said first gating circuit providing a gating signal;

a second gating circuit connected to permit operation of said first means in response to the application thereto of said second frequency signals; and means responsive to said gating signal from said first gating circuit for transmitting said second frequency signals to said second gating circuit.

7. The disconnect device defined by claim 6, said second means further including:

first timing means for setting a first time period during which said first frequency signals must be continually applied through said first filter circuit to said first gating circuit to cause actuation thereof; and second timing means for setting a second time period during which said second frequency signals must be continually applied from said second filter circuit to said second gating circuit to cause actuation thereof.

8. The disconnect device defined by claim 1 further including:

first and second storage means for storing electrical energy applied thereto;

switch means for applying electrical energy from said line conductors to either said first or second storage means;

means for controlling said switch means to apply said electrical energy to said first or second storage means; and bridge menas for coupling electrical energy from said line conductors to said switch means.

9. The disconnect device defined by claim 2, said relay further including a pair of relay coils, energization of a first one of said pair of relay coils causing closure of said relay contact to complete an electrical connection between one of said line conductors and said subscriber telephone, and energization of a second one of said pair of relay coils causing opening of said relay contact to break any electrical connection therethrough between said one line conductor and said subscriber telephone; and said second means including control means for selectively enabling energization of either said first or second relay coils, and frequency sensitive means for actuating said control means in response to said two predetermined frequency signals.

10. The disconnect device defined by claim 9, said frequency sensitive means including:

first and second filter circuits each tuned for one of said predetermined frequencies;

gating means connected to said first filter circuit for being actuated by the application of first frequency signals transmitted through said first filter circuit;

third means for applying second frequency signals to said control means, said third means being enabled by said gating means when actuated by said first frequency signals.

11. The disconnect device defined by claim 10, said second means further including:

first timing means for setting a first time period during which said first frequency signal must be continually applied through said first filter circuit to said gating circuit to cause actuation thereof; and second timing means for setting a second time period during which said second frequency signal must be continually applied from said second filter circuit to said control means to cause operation thereof.

12. The disconnect device defined by claim 11 further including:

first and second storage means for storing energy applied thereto;

means for selectively applying electrical energy to either said first or second storage means; and means connecting said first and second storage device to said first and second relay coils, respectively, to energize said first and second relay coils under the control of said control means.

13. The disconnect device defined by claim 12, said means for selectively applying electrical energy to either said first or second storage means including:

switching means for connecting said line conductor to either said first or second storage means; and means for operating said switching means to connect said line conductors to said first or second storage means.

14. The disconnect device defined by claim 13, said switching means including:

a diode connected to said line conductors for coupling electrical energy therefrom, and a switching relay contact having first and second positions respectively serving to enable said electrical energy to be applied to said first and second storage means; and said means for operating said switching means including another pair of relay coils which control said switching relay contact to be in said first or second positions, said another pair of relay coils being connected to be individually energized under the control of said control means and concurrently with said first and second relay coils, respectively, of said first means.

15. The disconnect device defined by claim 3, said second means including:

a first filter circuit tuned for a first one of said predetermined frequency signals;

a second filter circuit tuned for a second one of said predetermined frequency signals;

a first gating circuit connected to be actuated by said first frequency signals when transmitted through said first filter circuit, said first gating circuit providing a gating signal;

a second gating circuit connected to permit operation of said first means in response to the application thereto of said second frequency signals; and means responsive to said gating signals from said first gating circuit for transmitting said second frequency signals to said second gating circuit.

16. The disconnect device defined by claim 15, said second means further including:

first timing means for setting a first time period during which said first frequency signals must be continually applied through said first filter circuit to said first gating circuit to cause actuation thereof; and second timing means for setting a second time period during which said second frequency signals must be continually applied from said second filter circuit to said second gating circuit to cause actuation thereof.

* * * * *

UNITED STATES PATENT OFFICE
CERTIFICATE OF CORRECTION

Patent No. 3,852,537 Dated December 3, 1974

Inventor(s) Ogden W. Vincent

It is certified that error appears in the above-identified patent and that said Letters Patent are hereby corrected as shown below:

Column 3, line 19, "resistors" should be "resistor".

line 39, after "70", "72" should be inserted.

Column 4, line 46, "contact" should be "constant".

line 53, after "for the", "resistors" should be "transistors".

line 59, "Similraly" should be "Similarly".

Column 8, line 9, "menas" should be "means".

Signed and sealed this 11th day of February 1975.

(SEAL)
Attest:

RUTH C. MASON
Attesting Officer

C. MARSHALL DANN
Commissioner of Patents
and Trademarks